United States Patent [19]

Bieber et al.

[11] 4,361,217
[45] Nov. 30, 1982

[54] CLUTCH ASSEMBLY FOR SEMIAUTOMATIC GEAR TRANSMISSION

[75] Inventors: Gerold Bieber, Langenargen; Franz Boss, Kressbronn; Alfred Magg, Friedrichshafen, all of Fed. Rep. of Germany

[73] Assignee: Zahnradfabrik Friedrichshafen Aktiengesellschaft, Friedrichshafen, Fed. Rep. of Germany

[21] Appl. No.: 197,598

[22] Filed: Oct. 16, 1980

[30] Foreign Application Priority Data

Oct. 17, 1979 [DE] Fed. Rep. of Germany ....... 2941935

[51] Int. Cl.³ .......................................... F16D 25/063
[52] U.S. Cl. ............................ 192/103 FA; 192/3.33; 192/70.12; 192/85 AA; 192/113 B
[58] Field of Search .......... 192/103 FA, 103 F, 85 A, 192/85 AA, 113 B, 70.12, 3.33

[56] References Cited

U.S. PATENT DOCUMENTS

| | | | |
|---|---|---|---|
| 2,163,203 | 6/1939 | Kegresse | 192/103 FA |
| 2,837,192 | 6/1958 | Dunkelow | 192/103 FA |
| 3,190,421 | 6/1965 | Schulz | 192/85 AA |
| 3,202,253 | 8/1965 | Merritt et al. | 192/85 AA X |
| 3,642,107 | 2/1972 | Borman et al. | 192/103 F |
| 4,147,245 | 4/1979 | Folomin et al. | 192/85 AA |
| 4,186,829 | 2/1980 | Schneider et al. | 192/85 AA |

FOREIGN PATENT DOCUMENTS

| | | | |
|---|---|---|---|
| 633985 | 1/1962 | Canada | 192/85 AA |
| 643678 | 4/1937 | Fed. Rep. of Germany | 192/85 AA |

OTHER PUBLICATIONS

Sachs, "Hydrodynamischer Drehmoment-Wandler und Wandlerschaltkombinationen", pp. 1-10, Funktion und Werkstatthinweise.

Primary Examiner—Rodney H. Bonck
Attorney, Agent, or Firm—Karl F. Ross

[57] ABSTRACT

A disk clutch inserted between a torque converter and a synchromesh gear train of an automotive transmission comprises a driving friction-plate carrier coupled with the turbine of the converter and a driven friction-plate carrier coupled with an input shaft of the gear train, the driving carrier forming two fluidically separated concentric cylinder spaces between itself and an operating piston embraced thereby. The inner cylinder is of smaller effective area and is pressurized in normal operation by hydraulic fluid (oil) but can be temporarily depressurized, during gear shifting, by a valve controlled by the shifting mechanism; this space communicates via an internal flow channel of the driving carrier with a radial bore in that carrier occupied by a centrifugally and/or resiliently loaded body of a quick-venting valve normally blocking an exit port leading from the outer cylinder space to the interior of a surrounding housing. Upon the unblocking of that exit port in response to depressurization of the inner cylinder space, the piston is moved by a Belleville spring into a disengagement position until the inner cylinder space is repressurized whereupon fluid from that space re-enters the internal flow channel and represses the quick-venting valve to this blocking position while also passing through the valve body into the outer cylinder space to help return the piston to its engagement position.

10 Claims, 3 Drawing Figures

CLUTCH ASSEMBLY FOR SEMIAUTOMATIC GEAR TRANSMISSION

FIELD OF THE INVENTION

Our present invention relates to a clutch assembly for a semiautomatic gear transmission on an automotive vehicle equipped with driver-operated gear-shifting means.

BACKGROUND OF THE INVENTION

In automotive transmissions of the type referred to it is known to provide a torque converter ahead of a manually shiftable gear train of the synchromesh type, with interposition of a friction clutch designed to disconnect that gear train from the converter—and thus from the engine driving same—during manually initiated changes in speed ratio or "gear". Conventionally, the disengagement of the clutch is accomplished with the aid of a driver-operated pedal; more recent developments, however, eliminate the pedal by using servomechanisms responsive to command signals emitted by the manually operated speed changer at the beginning of a gear shift whose completion causes the clutch to be re-engaged. Shift levers adapted to generate such command signals have been disclosed in commonly owned U.S. applications Ser. No. 180,348, filed Aug. 22, 1980 by Willy Beig, and Ser. No. 185,884, filed Sept. 10, 1980 by Alfred Schobinger et al.

The clutches usually employed in known systems of this type are of the "dry" kind, operating without lubrication, and must therefore be housed in a compartment fluidically separated from adjoining compartments such as those accommodating the torque converter and the gear train. These clutches are generally closed or engaged by strong springs and thus require powerful servomechanisms for their opening or disengagement; moreover, they must be of considerable size for the transmission of large torques.

OBJECTS OF THE INVENTION

An important object of our present invention, therefore, is to provide an improved clutch assembly for the purpose described which is of compact structure and can be operated "wet", i.e. with lubrication enabling the use of a relatively weak spring force for its disengagement.

Another object is to provide means in such a clutch for adapting its rate of closure to different driving conditions in order to effect a smooth engagement in all instances.

SUMMARY OF THE INVENTION

We realize these objects, in accordance with our present invention, by providing a clutch with a driving and a driven carrier of friction elements such as the usual stacks of interleaved annular plates, the driving carrier being coupled with a torque converter for entrainment by the vehicular engine while the driven carrier is coupled with the gear train for powering the traction wheels of the vehicle during operation thereof; the two carriers are rotatable about a common axis which advantageously is also that of the converter. A piston interposed between these carriers forms with the driving carrier a first and a second cylinder space which are fluidically separated from each other, the second cylinder space preferably surrounding the first one and being of larger effective area than the latter. The first cylinder space has an inlet connectable to a source of hydraulic pressure fluid (referred to hereinafter as oil) for moving the piston into a position of engagement of the friction elements against the force of spring means restoring same to a position of disengagement upon disconnection of the inlet from the fluid source. The driving carrier is provided with passages forming an exit port which communicates with the second cylinder space and is blocked by valve means in that carrier responsive to fluid pressure in the first cylinder space; at least in the presence of such fluid pressure, certain of these passages connect the inlet to the second cylinder space whereby entering oil helps displace the piston into its engagement position. When the inlet is disconnected from the source, the exit port is unblocked by a biasing force which acts upon the valve means and is preferably a centrifugal force that could be supplemented by the force of a spring.

Pursuant to a more particular feature of our invention, the valve means comprises a quick-venting valve having a body situated in a radial bore of the driving carrier intersecting the aforementioned exit port, this bore having an end remote from the axis of rotation provided with an entrance port which is connected to an access port of the first cylinder space for letting oil from the inlet thereof repress that body against the possibly spring-supplemented centrifugal force acting thereon during rotation of the carrier. The same entrance port may communicate, in a radially inward position of the valve body, with an aperture leading to the second cylinder space for admitting oil thereto. The rate of admission is preferably controlled by a throttling valve independent of the quick-venting valve which has a plunger radially movable in a cylindrical recess of the driving carrier forming part of the connection between the aforementioned access and entrance ports; the plunger is centrifugally movable against a radially inward biasing force for progressively obstructing the entrance port with increasing rotary speed of that carrier.

According to a further advantageous feature of our invention, the driving carrier and the piston are preferably provided with coupling formations enabling limited relative rotation thereof between two closely spaced angular positions into which the piston is entrainable by a resiliently displaceable contact member bridging the gap between two confronting surfaces of the piston and of the driven carrier, the resulting relative angular position depending upon the relative speed of the two carriers in their disengaged state. A diaphragm in the first cylinder space, linked with the piston for joint rotation about the carrier axis, partly obstructs the access port leading to the valve means of the driving carrier in at least the relative angular position corresponding to a higher rotary speed of the driven carrier in order to restrict the flow rate through that access port under these circumstances, i.e. when the transmission operates under thrust with the traction wheels outrunning the engine, in comparison with the flow rate permitted in the other relative angular position which increases when the driving carrier leads the driven carrier upon disengagement of the clutch, i.e. when the transmission operates under pull.

The low-pressure area communicating with the second cylinder space upon unblocking of its exit port will generally be the interior of a housing surrounding the clutch assembly, this housing being advantageously provided with a conduit for the intermittent injection of lubricant preferably occurring only at instants of reengagement of the clutch. With the conduit opening into the housing on the side of the driven carrier, any lubricant thus deposited thereon can be quickly dislodged by centrifugal action when that carrier is set into rotation by the reclosure of the clutch. The latter, therefore, operates essentially "dry" most of the time but its housing need not be fluidically separated from an adjoining compartment containing the gear assembly.

BRIEF DESCRIPTION OF THE DRAWING

The above and other features of our invention will now be described in detail with reference to the accompanying drawing in which.

SPECIFIC DESCRIPTION

Figure 1:
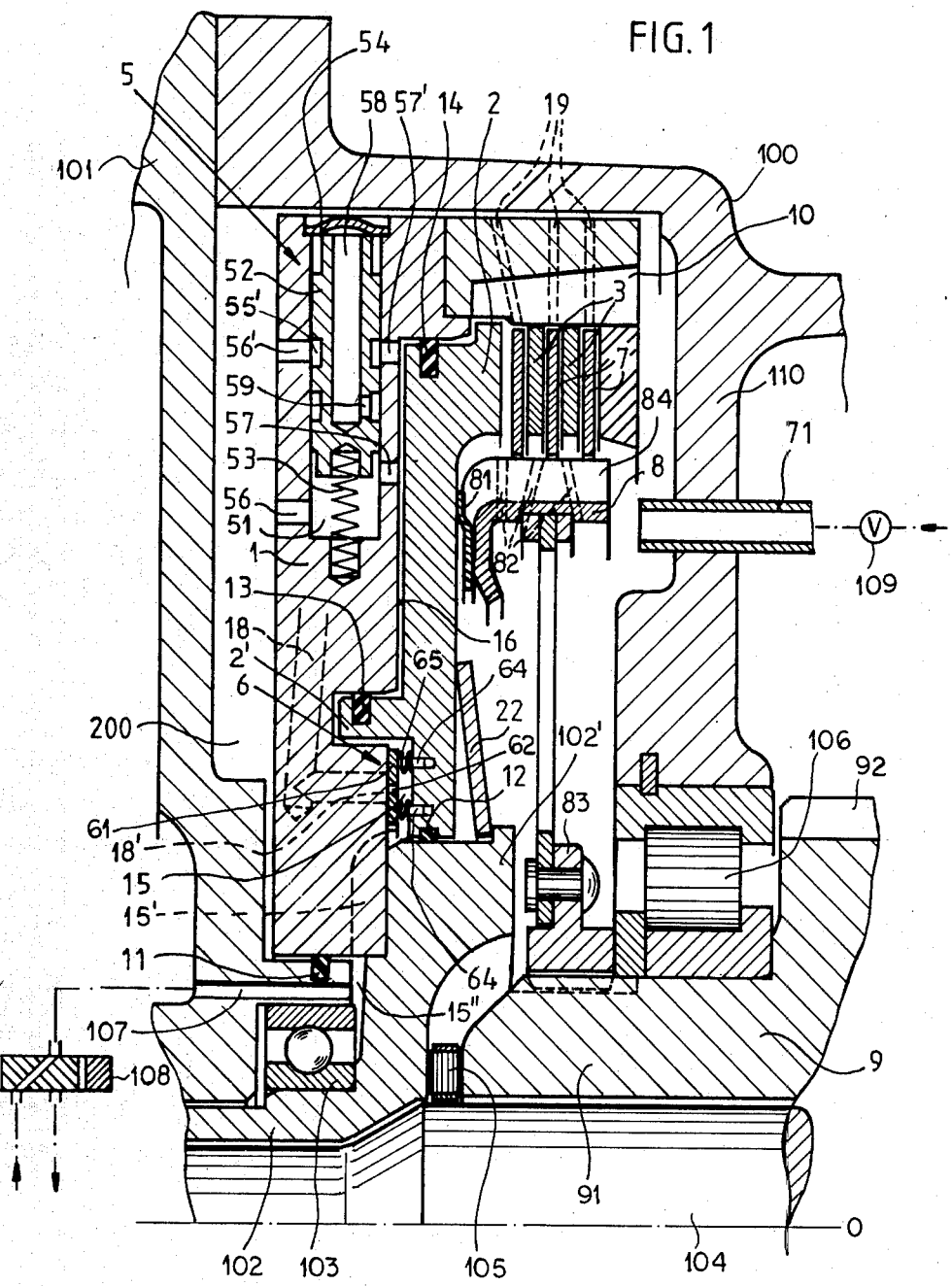
FIG. 1 is a cross-sectional view of an upper half of a clutch assembly according to our invention, with a diagramatic showing of associated elements.

In FIG. 1 we have shown a clutch assembly according to our invention interposed between a torque converter and a synchromesh gear train together forming part of an automotive transmission of the type marketed by our assignee for heavy-duty vehicles under the designation ZF-TRANSMATIC. The assembly comprises a stationary housing with two interconnected parts 100 and 101 defining between them a clutch compartment 200. A hydraulic torque converter, represented in the drawing only by a tubular output shaft 102 connected with its turbine, lies to the left of compartment 200. Shaft 102 is journaled in housing part 101 with the aid of ball bearings 103 and coaxially surrounds a main shaft 104 of the synchromesh gear train disposed to the right of compartment 100; only one gear 9 of that train, freely rotatable on shaft 104 but axially fixed thereon by means such as a thrust bearing 105, has been partially illustrated and is shown journaled in an end wall of housing part 100 by roller bearings 106. The converter, which may be of a type disclosed in commonly owned application Ser. No. 128,081 filed Mar. 7, 1980 by two of us (Franz Boss and Gerald Bieber) jointly with Karlheinz Schachmann, is driven from a nonillustrated engine of an automotive vehicle whose traction wheels are coupled with the main shaft 104 of the shiftable gear train.

A friction clutch disposed in the annular housing compartment 200, centered on shaft axis 0, comprises a driving carrier 1 and a driven carrier 8 of mutually interleaved friction elements in the form of stacked ring plates 3 and 7. Carrier 1, which is rigid with turbine shaft 102, has an annular pheripheral flange provided with ribs 10 on which the friction plates 3 are slidably supported in the usual manner. A similar flange of carrier 8 has ribs 84 slidably supporting the friction plates 7. A piston 2 interposed between the two carriers 1,8 is axially slidable on a hub 102' of shaft 102 which also carries a Belleville spring 22 urging that piston toward carrier 1. In its disengagement position illustrated in the drawing, piston 2 closely adjoins the carrier 1 and allows the interleaved friction plates 3 and 7 to separate sufficiently to decouple the driving carrier 1 from the driven carrier 8. An annular blade 81 on carrier 8, however, bridges a gap existing between confronting surfaces of this carrier and piston 2 whereby the latter can be frictionally entrained about axis 0, relatively to carrier 1, in one direction or the other between two closely spaced angular positions defined by a peripheral lug 21 on the piston received with clearance in a cutout 17 of carrier 1 as seen in FIG. 2.

Figure 2:
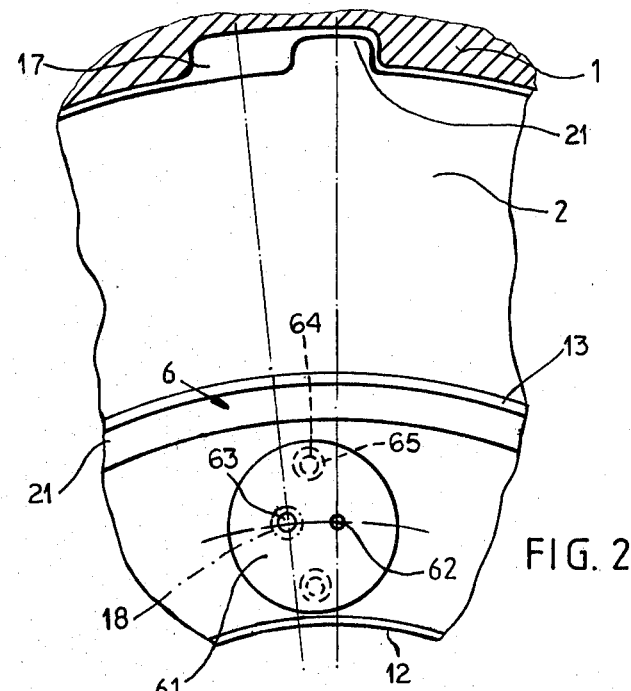
FIG. 2 is a fragmentary face view of a piston forming part of the clutch assembly of FIG. 1.

The angular position illustrated in FIG. 2 is assumed to occur under certain loading conditions (e.g. during downhill driving) when the wheels outrun the engine, i.e. when the driven carrier 8 leads the driving carrier 1 upon disengagement of the clutch; with normal loading, i.e. with carrier 1 leading carrier 8, piston 2 is in its alternate position relative to carrier 1 when the two carriers are disengaged.

An inner cylinder space 15 and an outer cylinder space 16 coaxial therewith are defined between carrier 1 and piston 2, space 16 having a considerably larger effective area than space 15. Inner space 15 is sealed against the housing compartment 200 by two annular gaskets 11 and 12, e.g. of Teflon. Gasket 11, mounted on housing part 101 and bearing upon the inner peripheral surface of carrier 1, could also be replaced by a labyrinth seal; gasket 12 sits on the inner periphery of piston 2 and bears upon hub 102'. A further gasket 13 in an annular flange 2' of piston 2, received in a complementary groove of carrier 1, fluidically separates the two spaces 15 and 16 from each other; space 16 is sealed against the housing by a fourth gasket 14 on the outer periphery of piston 2 bearing upon an inner annular surface of carrier 1.

Carrier 1 is provided with one or more channels 15' connecting the cylinder space 15 with an extension 15" thereof bounded by housing part 101 and hub 102'. A bore 107 in housing part 101 opens into space 15" and, as diagrammatically illustrated, communicates with a hydraulic circuit including a valve 108 connecting that bore with an oil pump in one position and with a sump (or an oil reservoir for the torque converter) in another position, as symbolized by arrows. Valve 108 is controlled by a manually operated lever, not shown, serving to change the speed ratio between an input shaft 91 (integral with gear 9) and an output shaft of the associated gear train, i.e. the shaft 102 on which the gear 9 and other gears of that train are journaled with the aid of nonillustrated roller bearings. Gear 9, whose teeth 92 are in permanent mesh with those of an associated gear on an ancillary shaft parallel to axis 0, may be selectively clutched directly to shaft 102 or may transmit its torque to that shaft through other gear pairs as is well known in the art. Driven carrier 8 has a hub 83 keyed to shaft 91 to entrain the gear 9 upon being frictionally coupled with carrier 1 by a rightward displacement of piston 2 under hydraulic pressure overcoming the countervailing force of Belleville spring 22.

When the operator of the vehicle initiates a speed change or switches from neutral into gear, as by rotating or raising a knob on the shift lever according to application Ser. No. 185,884 referred to above, valve 108 is displaced by an electrical command signal from its illustrated oil-supplying position to drain the cylinder space 15. When the synchromesh clutch coacting with the newly selected gear fully engages the latter, the command signal disappears (or is replaced by a different signal) to restore the valve 108 to its previous position whereby oil is again fed under pressure to space 15. This space communicates through an access port 18' with an internal channel 18 of carrier 1 which terminates at a pair of cascaded valves controlling the flow of oil into and out of the outer cylinder space 16, namely a speed-responsive throttle valve 4 (shown only in FIG. 3) and a quick-venting valve 5. Throttle valve 4 comprises a thimble-shaped plunger 46 radially slidable in a cylindrical recess 41 which forms an enlargement of channel 18 near the outer periphery of carrier 1 where the centrifugal force is at a maximum. A biasing spring 43 bears upon a closure cap 45 and the bottom 42 of plunger 46, thereby urging the latter toward the inner end of the recess. An edge 48 at the outer end of plunger 46 progressively obstructs a passage 44, leading to an adjacent radial bore 51 in carrier 1, which communicates with channel 18 by way of a hole 47 in plunger bottom 42. Valve 5 has a body which is radially slidable in bore 51 and is urged outward, toward a closure cap 54, by a biasing spring 53 supplementing the centrifugal force generated upon rotation of the carrier.

Figure 3:
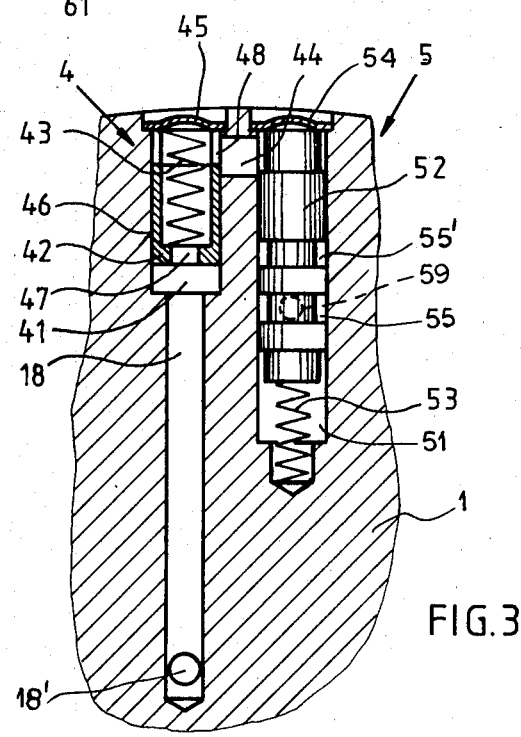
FIG. 3 is a fragmentary sectional view of a carrier member included in the same clutch assembly.

Valve body 52 has a central channel 58 which opens onto its outer end and is closed by the cap 54 when that body occupies its outermost position as illustrated in FIGS. 1 and 3. Channel 58 has a lateral outlet 59 leading to a ring groove 55 which in the innermost position of the valve body registers with a port 57 of carrier 1 opening into cylinder space 16. In the position shown, port 57 communicates directly via bore 51 with an exit port 56 of carrier 1 opening into housing compartment 200, that compartment being provided with a nonillustrated bottom drain through which oil discharged from space 16 is returned to the circulatory system; a second port 57' open toward space 16 communicates in the same valve position via a ring groove 55' of body 52 with another exit port 56'.

With valve 108 allowing oil to re-enter the previously drained space 15 upon completion of a gear shift, the pressure built up in that space will not suffice to overcome the full force of Belleville spring 22 and will therefore displace the piston 2 only to a point of incipient clutch closure. Some of that oil, however, will flow through channel 18 into valve 4 and thence via passage 44 into the outer end of bore 51, thus pressing the valve body 52 inward against the force of spring 53 and whatever centrifugal force acts upon it at that time. When the valve body leaves the closure cap 54, oil will also enter its channel 58 and eventually reach the port 57 to fill the space 16, thereby generating sufficient pressure to complete the engagement stroke. With higher speeds of carrier 1, therefore, the re-engagement will take place less rapidly for a smoother clutch-in. At the beginning of the next gear shift, the reversal of valve 108 relieves the oil pressure in space 15 and channel 18 so that valve body 52 is quickly returned to its outermost position with instant drainage of space 16 via ports 56, 56' and 57, 57'.

The access port 18' of channel 18 is provided with a load-responsive diaphragm 6 comprising a disk 61, best shown in FIG. 2, which is linked with piston 2 by means of pins 64 allowing relative axial displacement; pins 64 are surrounded by relatively weak springs 65 keeping the disk 61 in all piston positions in contact with carrier 1. When the decoupled driven carrier 8 rotates more rapidly than driving carrier 1, causing piston 2 to occupy the relative angular position illustrated in FIG. 2 as discussed above, a narrow bore 62 of disk 61 registers with port 18' to restrict the influx of oil into channel 18 during re-engagement compared to that which, under otherwise equal conditions, exists when the traction wheels lag behind the engine as is normally the case. In the latter instance, i.e. with piston 2 and disk 61 in their alternate angular position relative to carrier 1, a larger bore 63 of the disk overlies the port 18'.

As further shown in FIG. 1, a wall 110 of housing part 100 adjoining the driven carrier 8 is traversed by a conduit 71 through which some of the circulating oil can be injected into compartment 200 for lubricating the friction plates 3 and 7. A valve 109 in conduit 71 is briefly opened upon incipient re-engagement of clutch 1, 2, 8, e.g. by the signal which restores the supply valve 108 to its illustrated position, so that the lubricating oil enters the clutch compartment only during beginning rotation of carrier 8. Generally radial passages 82 in carrier 8 and 19 in carrier 1, shown to extend through the corresponding ribs 84 and 10, facilitate the subsequent ejection of oil particles clinging to carrier 8 and plates 3, 7 by centrifugal force, these particles being intercepted by the peripheral housing wall from which they are removed by the same drain that carries off the oil discharged from space 16 via venting ports 56, 56'. Thus, the clutch is essentially dry between gear shifts.

It will be apparent that valves 108 and 109 could also be controlled mechanically, e.g. by a driver-operated pedal.

Flow-controlling devices 4, 5 and 6 could, of course, be duplicated at several angularly spaced locations of carrier 1.

We claim:

1. In an automotive transmission including a torque converter powered by an engine aboard a vehicle, a manually shiftable gear train coupled with vehicular traction wheels, and a friction clutch inserted between said torque converter and said gear train for temporarily decoupling the latter from the engine during changes in speed ratio, the improvement wherein said friction clutch comprises:
a driving friction-element carrier rotatable about an axis and coupled with said torque converter for entrainment by the engine;
a driven friction-element carrier rotatable about said axis and coupled with said gear train for powering the traction wheels during operation of the vehicle;
a piston interposed between said driving and driven carriers, said piston forming with said driving carrier a first and a second cylinder space fluidically separated from each other, said first cylinder space having an inlet connectable to a source of hydraulic pressure fluid for moving said piston into a position of engagement of the friction elements of said carriers, said piston being provided with spring means for moving same into a position of disengagement of said friction elements upon disconnection of said inlet from said source, said driving carrier being provided with passages forming an exit port communicating with said second cylinder space; and
valve means on said driving carrier responsive to fluid pressure in said first cylinder space for blocking said exit port while connecting said inlet via part of said passages to said second cylinder space whereby entering pressure fluid helps displace said piston into its position of engagement, said valve means being biased to unblock said exit port upon disconnection of said inlet from said source to vent said second cylinder space to an adjoining low-pressure area.

2. The improvement defined in claim 1 wherein said second cylinder space coaxially surrounds said first cylinder space and has a larger effective area than the latter.

3. The improvement defined in claim 1 or 2 wherein said valve means comprises a quick-venting valve having a body seated in a radial bore of said driving carrier intersecting said exit port, said bore having an end remote from said axis provided with an entrance port connected to an access port of said first cylinder space for letting pressure fluid from said inlet repress said body against a centrifugal force generated by rotation of said driving carrier.

4. The improvement defined in claim 3 wherein said body is provided with a radially outwardly acting biasing spring supplementing said centrifugal force.

5. The improvement defined in claim 3 wherein said body has a channel communicating in a radially inward position thereof with said entrance port and with an aperture leading to said second cylinder space for admitting pressure fluid thereto.

6. The improvement defined in claim 5, further comprising a throttling valve independent of said quick-venting valve having a plunger radially movable in a cylindrical recess of said driving carrier forming part of the connection between said access port and said entrace port, said plunger being centrifugally movable against a radially inward biasing force for progressively obstructing said entrance port with increasing rotary speed of said driving carrier.

7. The improvement defined in claim 1 or 2 wherein said driving carrier and said piston are provided with coacting formations enabling limited relative rotation thereof between two closely spaced relative angular positions, said driven carrier and said piston having confronting surfaces separated by a gap bridged by a resiliently displaceable contact member projecting from one of said surfaces for rotating said piston in its position of disengagement into one of said angular positions upon said driving carrier leading said driven carrier and into the other of said relative angular positions upon said driven carrier leading said driving carrier, further comprising diaphragm means in said first cylinder space linked with said piston for partly obstructing said access port at least in said other of said relative angular positions to restrict the flow rate therethrough in comparison with the flow rate in said one of said relative angular positions.

8. The improvement defined in claim 7 wherein said diaphragm means comprises a disk with a larger opening and a smaller opening respectively aligned with said access port in said one and said other of said relative angular positions.

9. The improvement defined in claim 1 or 2 wherein said adjoining low-pressure area is the interior of a housing surrounding said carriers and said piston, said housing being provided with intermittently operable injection means facing said driven carrier for supplying lubricant of the same composition as said pressure fluid into said housing for a brief period following reconnection of said inlet to said source.

10. The improvement defined in claim 9 wherein said friction elements are supported on annular flanges of said carriers provided with generally radial openings facilitating centrifugal ejection of adhering lubricant particles toward a peripheral housing wall upon joint rotation of said carriers.

* * * * *